(12) United States Patent
Hickman

(10) Patent No.: US 12,330,816 B1
(45) Date of Patent: Jun. 17, 2025

(54) ADVANCED ELECTRIC RESISTANCE THERMAL PROPULSION SYSTEMS

(71) Applicant: Robert Alan Hickman, Chapel Hill, NC (US)

(72) Inventor: Robert Alan Hickman, Chapel Hill, NC (US)

( * ) Notice: Subject to any disclaimer, the term of this patent is extended or adjusted under 35 U.S.C. 154(b) by 4 days.

(21) Appl. No.: 18/669,146

(22) Filed: May 20, 2024

(51) Int. Cl.
*B64G 1/40* (2006.01)

(52) U.S. Cl.
CPC ............. *B64G 1/409* (2013.01); *B64G 1/40* (2013.01); *B64G 1/415* (2023.08)

(58) Field of Classification Search
CPC .......... B64G 1/40; B64G 1/409; B64G 1/411; B64G 1/415; F03H 99/00; F03H 1/0031
See application file for complete search history.

(56) References Cited

U.S. PATENT DOCUMENTS

| | | | | |
|---|---|---|---|---|
| 5,170,623 A | * | 12/1992 | Dailey | F02K 9/74 60/202 |
| 2014/0183792 A1 | * | 7/2014 | Leu | B33Y 10/00 264/401 |
| 2020/0033070 A1 | * | 1/2020 | Vlahinos | B01F 25/43231 |
| 2021/0197987 A1 | * | 7/2021 | Kokorich | B64G 1/244 |
| 2023/0417451 A1 | * | 12/2023 | Romei | F24H 9/1863 |

OTHER PUBLICATIONS

"Design and testing of additively manufactured high-efficiency resistojet on hydrogen propellant", Coral et al. 2021 (Year: 2021).*
"Design and Predicted Performance of a Liquid Hydrogen PET Thruster" Burton 1988 (Year: 1988).*
Wikipedia Triply Periodic Minimal Surface Page available at https://en.wikipedia.org/wiki/Triply_periodic_minimal_surface (last accessed May 16, 2024).

* cited by examiner

*Primary Examiner* — Gerald L Sung
(74) *Attorney, Agent, or Firm* — LeonardPatel PC; Michael A. Leonard, II; Sheetal S. Patel

(57) ABSTRACT

Electric resistance thermal propulsion systems that are configured to heat propellants for expulsion from a thruster using a heat exchanger that includes ultra-high temperature ceramics, such as hafnium carbide (HfC), are disclosed. The heating chamber may also be constructed from such materials. In operation, the electric resistance thermal propulsion system raises the temperature of the propellants that exit the heating chamber to expand in the nozzle to generate thrust. HfC, for example, has both metal and ceramic properties, and thus, it can conduct the electrical current. The higher the temperature, the higher the specific impulse that can be generated, and the electric resistance thermal propulsion systems can tolerate a much higher temperature than has been possible before with this type of thruster.

13 Claims, 4 Drawing Sheets

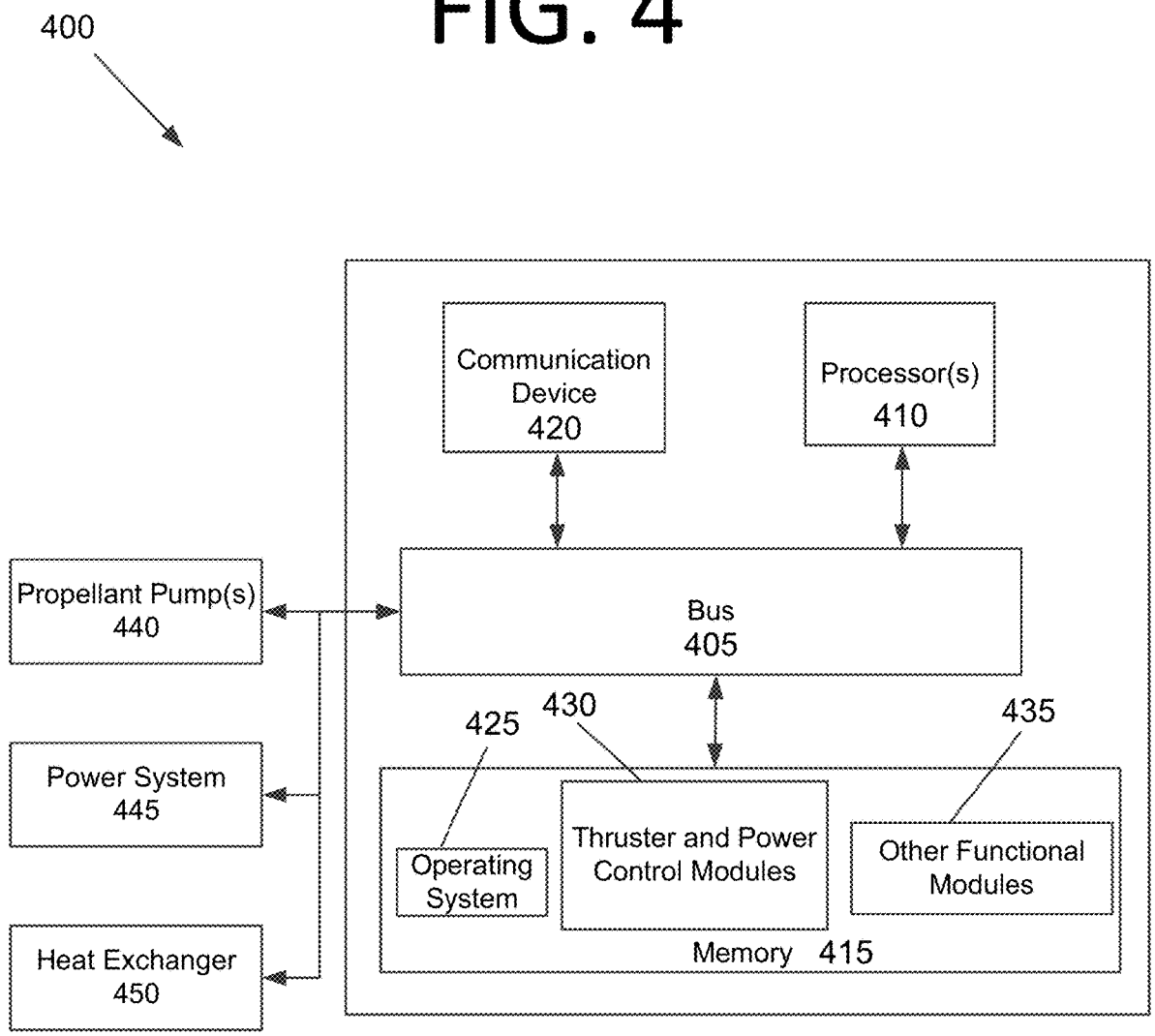

ADVANCED ELECTRIC RESISTANCE THERMAL PROPULSION SYSTEMS

FIELD

The present invention generally pertains to propulsion for spacecraft, and more particularly, to electric resistance thermal propulsion systems that are configured to heat propellants for expulsion from a thruster using a heat exchanger that includes ultra-high temperature ceramics.

BACKGROUND

Current rocket propulsion systems generate thrust by accelerating propellant, either by heating a gas and allowing it to expand through a converging-diverging nozzle or by generating a plasma that is accelerated by a magnetic field. The former is commonly referred to "thermal propulsion" and the latter is commonly referred to as "ion propulsion." In thermal propulsion, the gas can be heated by the energy released in an exothermic reaction (chemical thermal propulsion), the energy can be imparted by focused solar electromagnetic radiation (solar thermal propulsion), the energy can be imparted by heat produced by a nuclear reactor, or the energy can be supplied by an electric current (electrothermal propulsion). The effectiveness of a thermal propulsion system in terms of specific impulse is a function of the exhaust velocity of the propellants. In thermal propulsion, the maximum achievable exhaust velocity is given by:

$$\text{Maximum Exhaust Velocity} = (2g_c c_p T_0)^{0.5} \quad (1)$$

where $g_c$ is the gravitational constant, $c_p$ is the specific heat of the propellant, and $T_0$ is the propellant temperature.

The ability of materials to sustain high temperatures limits all thermal propulsion systems to operating temperatures less than 6000° Fahrenheit (F). For the best available propellants (liquid hydrogen ($LH_2$)/liquid oxygen ($LO_2$)), chemical thermal propulsion can achieve a maximum exhaust velocity of around 15,000 feet per second (ft/sec) and can generate high thrust levels. To conduct missions requiring a spacecraft with high velocity, such a mission to Mars, a system with a higher exhaust velocity is desirable.

Exhaust velocity is highest if the propellant has a high $c_p$. Hydrogen gas has the highest known $c_p$ and can achieve an exhaust velocity of 36,000 ft/sec if heated to 6000° R. The question, however, is how to heat the hydrogen. A resistojet is an electrothermal thrust device that produces thrust by exposing a gas to a hot incandescent filament that is resistively heated by an electrical current passing through the filament. The heated gas is then allowed to expand through a nozzle to generate thrust. Resistojets have been used for station keeping on satellites since 1964. Historically, they have been characterized by very low thrust and low specific impulse (less than 500 seconds). The resistojet performance has been limited by using storable propellants such as hydrazine with inherently poor performance, operating temperatures limited by the maximum temperature the heating element can withstand, and low thermal transfer rates associated with the heating element design. Accordingly, an improved and/or alternative propulsion system may be beneficial.

SUMMARY

Certain embodiments of the present invention may be implemented and provide solutions to the problems and needs in the art that have not yet been fully solved by existing propulsion systems, or provide a useful alternative thereto. For example, some embodiments pertain to electric resistance thermal propulsion systems that are configured to heat propellants for expulsion from a thruster using a heat exchanger that includes ultra-high temperature ceramics.

In an embodiment, an electric resistance thermal thruster includes a heating chamber and a power source configured to provide electrical power. The electric resistance thermal thruster also includes a heat exchanger located within the heating chamber and operably connected to the power source. The heat exchanger is constructed from at least one ultra-high temperature ceramic. The heat exchanger is configured to resistively conduct an electrical current from the power source, thereby generating heat for the heating chamber to heat propellant when passed therethrough.

In another embodiment, an electric resistance thermal thruster includes a heating chamber and a power source configured to provide electrical power. The electric resistance thermal thruster also includes a heat exchanger located within the heating chamber and operably connected to the power source, the heat exchanger comprising hafnium carbide (HfC). The electric resistance thermal thruster further includes a propellant tank configured to store propellant and an injector operably connected to the heating chamber. Additionally, the electric resistance thermal thruster includes a pump operably connected to the propellant tank and the injector. The pump is configured to cause the injector to inject the propellant into the heating chamber. The electric resistance thermal thruster also includes a computing system configured to control operation of the pump and the power source in order to control an amount and temperature of the propellant. The heat exchanger is configured to resistively conduct an electrical current from the power source, thereby generating heat for the heating chamber to heat propellant when passed therethrough.

In yet another embodiment, an electric resistance thermal thruster includes a heating chamber and a power source configured to provide electrical power. The electric resistance thermal thruster also includes a heat exchanger located within the heating chamber and operably connected to the power source. The electric resistance thermal thruster further includes a nozzle. The heat exchanger is constructed from at least one ultra-high temperature ceramic. The heat exchanger is configured to resistively conduct an electrical current from the power source, thereby generating heat for the heating chamber to heat liquid hydrogen propellant ($H_2$) when passed therethrough. The heat exchanger is configured to operate at a temperature greater than 3,000 Kelvin (K) and a pressure of less than 1 megapascal (MPa), thereby causing production of monoatomic hydrogen ($H_1$) from the $H_2$ propellant. The nozzle is an extended nozzle comprising a length greater than 12 times a throat diameter of the extended nozzle in order to provide a greater opportunity for the $H_1$ to recombine to form $H_2$. In operation, the electric resistance thermal thruster provides a specific impulse of at least 1,000 seconds.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 4 is a block diagram illustrating a computing system configured to control an electric resistance thermal thruster, according to an embodiment of the present invention.

Unless otherwise indicated, similar reference characters denote corresponding features consistently throughout the attached drawings.

DETAILED DESCRIPTION OF THE EMBODIMENTS

Figure 1:
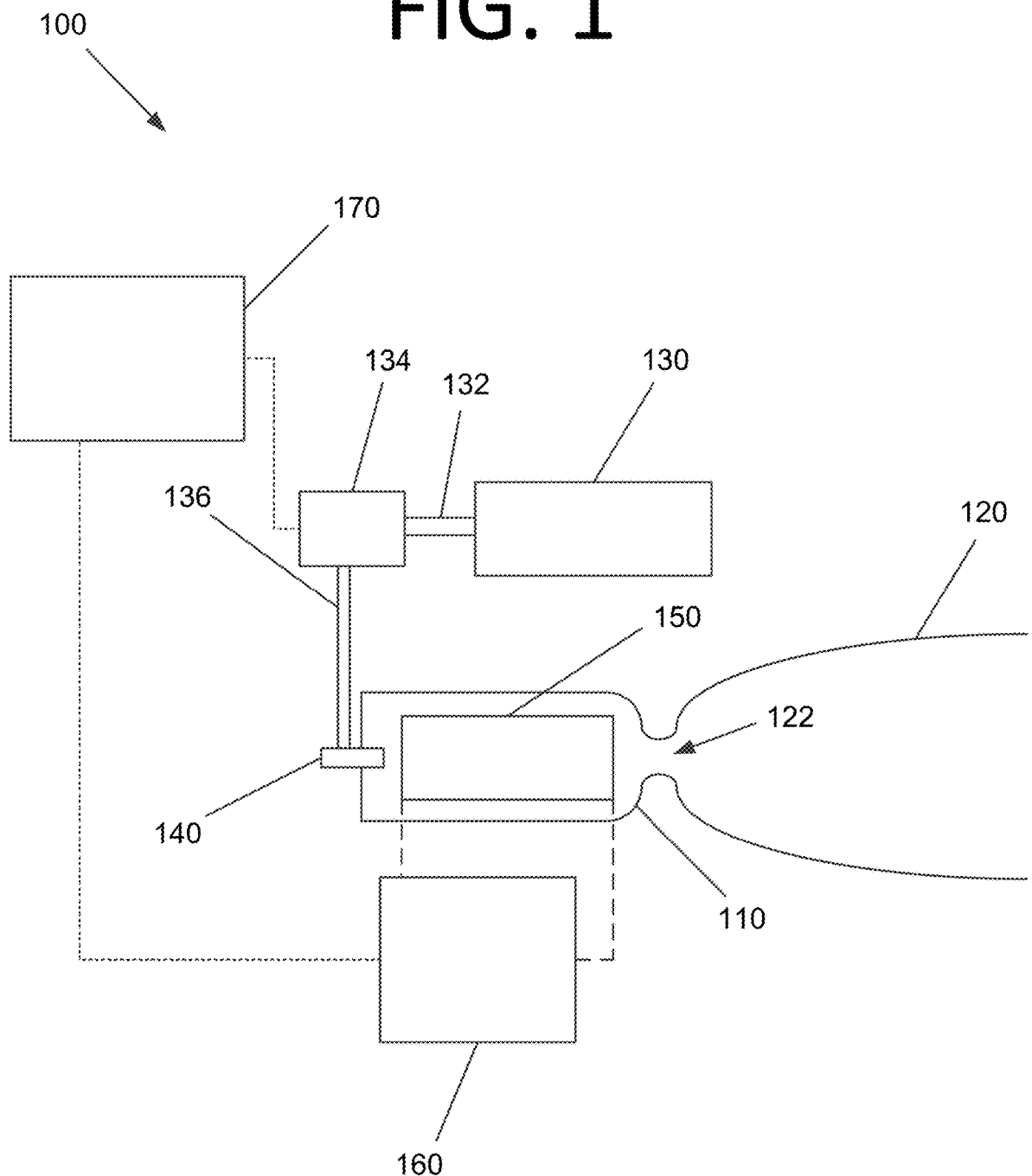
FIG. 1 is a schematic illustrating an electric resistance thermal thruster and related components, according to an embodiment of the present invention.

Some embodiments of the present invention pertain to electric resistance thermal propulsion systems that are configured to heat propellants for expulsion from a thruster using a heat exchanger that includes ultra-high temperature ceramics, such as hafnium carbide (HfC). In some embodiments, the heating chamber may also be constructed from such materials. In operation, the electric resistance thermal propulsion system raises the temperature of the propellants that exit the heating chamber to expand in the nozzle to generate thrust. HfC has both metal and ceramic properties, and thus, it can conduct the electrical current. The higher the temperature, the higher the specific impulse that can be generated, and the electric resistance thermal propulsion systems of some embodiments can tolerate a much higher temperature than has been possible before with this type of thruster.

Upon reaching approximately 3,700 Kelvin (K), the hydrogen begins to dissociate due to the right combination of temperature and pressure. HfC melts at approximately 4,200 K, so it is a good candidate material to tolerate dissociation temperatures. As the hydrogen cools after exiting the heating chamber, it rapidly recombines, which significantly adds to the specific impulse of the propellant. This can approximately double the specific impulse that is achieved. Other heating techniques, such as passing the hydrogen through a nuclear reactor, are only able to achieve approximately 2,700 K before a core meltdown occurs. Other ultra-high temperature ceramics exist that may be used, but some of these may tolerate lower temperatures. These materials include, but are not limited to, hafnium carbonitride (HfCN), tantalum carbide (TaC), and zirconium carbide (ZrC). These materials have melting temperatures of 4,383 K, 4,041 K, and 3,673 K, respectively.

Some embodiments require significant amounts of power (e.g., approximately 10 kilowatts (kW) per newton of thrust) to generate sufficient electrical current to achieve these temperatures. A nuclear reactor can generate sufficient amounts of power for this purpose. However, in some embodiments, the heat exchanger is powered using solar cells and/or a battery in addition to or in lieu of a nuclear reactor. Nuclear electric propulsion can be used to generate electricity and can lower the reactor temperature by about 1,000 K to approximately 1,700 K, which is easier for the propulsion system to tolerate. The Sterling or Brayton cycle may be used to generate electricity from the nuclear reactor. It should also be noted that even without atomic disassociation, the specific impulse of the hydrogen is still improved to approximately 1,100 seconds, which is more than twice that which is achieved using conventional resistojets.

Hydrogen is a gas with the highest specific heat of any gas. Using hydrogen as the propellant in some embodiments can generate the highest known maximum exhaust velocity for a given temperature. The achievable exhaust velocity is limited by the fluid temperature in the heating chamber. The maximum chamber temperature is limited by the thermal environment the heat exchanger, chamber, and nozzle materials can withstand. Ultra-high temperature ceramics, such as HfC, have a melting point in excess of 4190 K. This permits propellant temperatures of 3700 K to be achieved, per the above.

If hydrogen gas ($H_2$) is heated to temperatures above 3000 K at low pressure (less than one megapascal (MPa)) the gas begins to dissociate into monatomic hydrogen atoms also known as atomic hydrogen ($H_1$). Approximately 4.46 electron volts (EV) is required to break the $H_2$ bond and create $H_1$. This translates to a dissociation energy of 215 megajoules (MJ) per kilogram (kg) of $H_1$ that is produced. The $H_1$ and $H_2$ molecules are in equilibrium with $H_1$ and $H_2$ molecules being created and destroyed at the same rate. However, if the temperature goes down or the pressure goes up, the mole fraction of $H_1$ will rapidly decrease.

As the $H_1$ atoms recombine to form $H_2$, the energy of dissociation is released to increase the temperature of the gas. In some embodiments, the heat exchanger provides the heat and energy required for dissociation and the energy associated with the recombing $H_1$ atoms can be recovered in the converging and diverging sections of the nozzle as the temperature drops as the gas expands and moves toward the exit. If atomic hydrogen is present, it will recombine to form $H_2$, and the resulting release of energy will reduce the temperature drop and increase the resulting specific impulse. An $H_1$ mole fraction of 0.6 will result at a temperature of 3700 K and a pressure of 0.1 MPa. If all of the $H_1$ atoms recombine in the nozzle, a specific impulse of 1,822 seconds will be produced. This is approximately four times better than chemical propulsion and two times better than the planned performance of NASA's Nuclear Thermal Propulsion program. To permit more time for the $H_1$ molecules to recombine, the thruster can be configured with an extended nozzle with a length greater than what is typical, which is 12 times the throat diameter.

In some embodiments, the heat exchanger is configured as a triply periodic minimal surface (TPMS). A TPMS is a minimal surface in $R^3$ that is invariant under a rank-3 lattice of translations. TPMSs have the symmetries of a crystallographic group. Numerous examples exist with cubic, tetragonal, rhombohedral, and orthorhombic symmetries. Monoclinic and triclinic examples are certain to exist, but are difficult to parametrize. These shapes have demonstrated up to 120% improvement in heat transfer coefficients compared to state of the art printed circuit heat exchangers, and even more compared to shell and tube designs. The heat of the gas exiting the heat exchanger is dependent on the operating temperature and efficiency of the heat exchanger.

FIG. 1 is a schematic illustrating an electric resistance thermal thruster 100 and related components, according to an embodiment of the present invention. A heating chamber 110 is operably connected to a nozzle 120. Propellant exits heating chamber 110 and enters nozzle 120 via converging portion 122. Propellant is stored in a propellant tank 130 and enters pump(s) 134 via a propellant tank line 132. Pump(s) 134 pump the propellant through propellant pump line 136 to an injector 140, where the propellant is injected into heating chamber 110. The propellant flows through heat exchanger 150, where it is heated to operational temperature.

A power source 160 provides electric power to heat exchanger 150. Heat is generated by the electrical resistance to the current of heat exchanger 150. A computing system 170 controls the operation of pump(s) 134 and power source 160. In some embodiments, computing system 170 may be computing system 400 of FIG. 4.

The propellant is pumped by pump(s) 134 at pressures that are above the operating pressure of heating chamber 110. In some embodiments, the pressure is just above the operating pressure of heating chamber 110. For instance, in some embodiments, the operating pressure may be as high as 44 MPa and the propellant pressure may be approximately 44.5 MP. If atomic hydrogen is to be generated, the operating pressure of the chamber should be below 1 MPa, and the propellant and operating temperature should be greater than 3000 K. The pressure should be sufficient for the heated combined propellant to achieve Mach 1 in converging portion 122 of nozzle 120 and provide for sufficient expansion of the propellant gases in nozzle 120.

Figure 2:
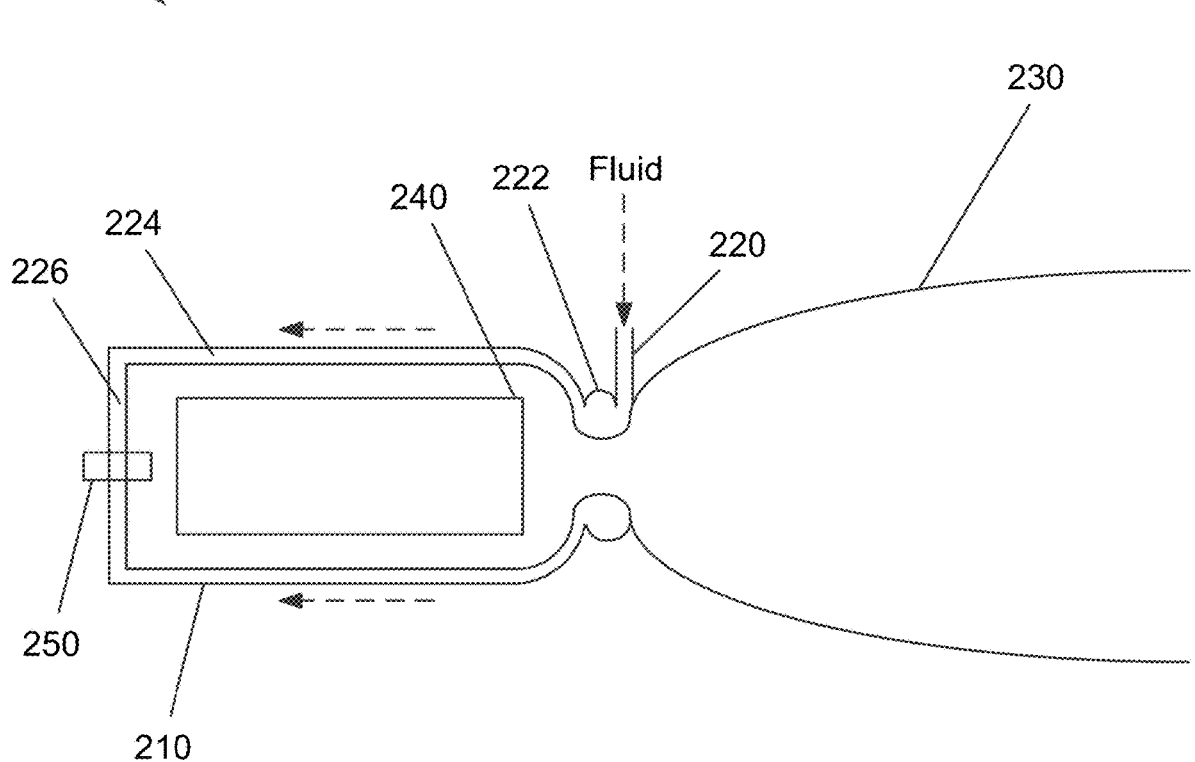
FIG. 2 is a cross sectional view illustrating an electric resistance thermal thruster with regenerative cooling, according to an embodiment of the present invention.

FIG. 2 is a cross sectional view illustrating an electric resistance thermal thruster 200 with regenerative cooling, according to an embodiment of the present invention. In some embodiments, thruster 200 may be thruster 100 of FIG. 1. Thruster 200 includes a heating chamber 210 and a nozzle 230. Fluid enters inlet 220 and travels to a lower fluid header 222. Lower fluid header 222 is a fluid cavity where the fluid is injected and directed to fluid channels 224, which are adjacent to the walls of heating chamber 210.

The fluids flow through fluid channel 224 to reach an upper fluid header 226, which is a fluid cavity that receives the fluid from fluid channel 224. Heat is transferred to the fluid from heating chamber 210 and nozzle 230 as it traverses fluid channels 224. The fluid then enters an injector 250. In some embodiments, injector 350 may be injector 140 of FIG. 1.

Figure 3:
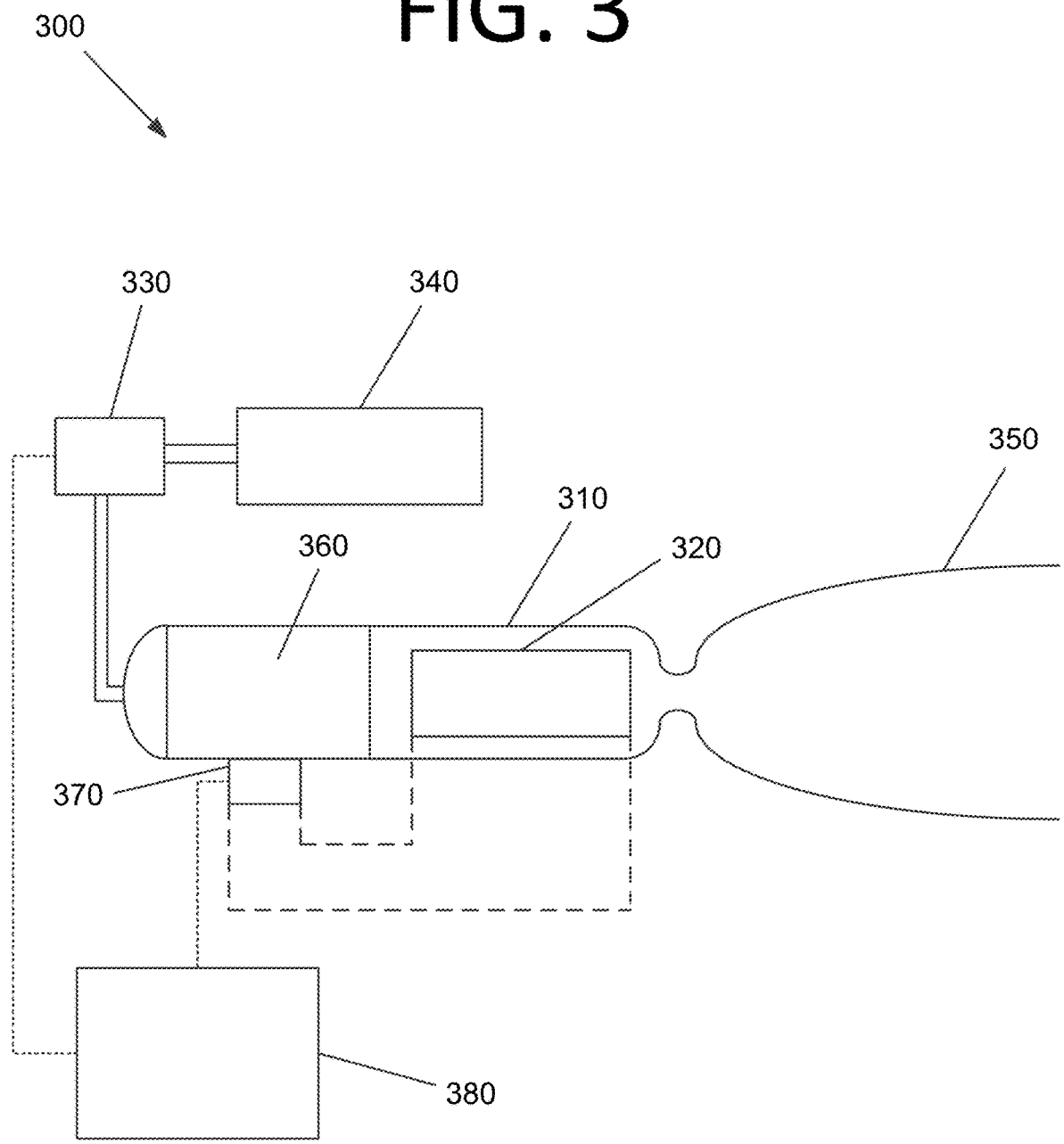
FIG. 3 is a cross sectional view illustrating an electric resistance thermal thruster combined with a nuclear thermal reactor, according to an embodiment of the present invention.

FIG. 3 is a cross sectional view illustrating an electric resistance thermal thruster 300 combined with a nuclear thermal reactor 360, according to an embodiment of the present invention. In some embodiments, thruster 300 may be thruster 100 or 200 of FIGS. 1 and 2, respectively. A propellant pump 330 pumps propellant from propellant tank 340 into nuclear reactor 360. Propellant flowing through nuclear reactor 360 is heated up to a temperature of approximately 2700 K in some embodiments. This is the limit of the ability of nuclear reactor 360 to heat the gas due to the melting temperature of the nuclear fuel. The propellant exits nuclear reactor 360 and enters a heating chamber 310, where a heat exchanger 320 will increases the temperature of the propellant. This increases the potential specific impulse of thruster 300 as the gas exits a nozzle 350. Heat exchanger 320 can be powered by a thermodynamic power cycle using the heated fluid from nuclear reactor 360 to produce electrical power, or as shown in this embodiment, a thermionic electric power generator 370, which coverts waste heat produced by nuclear reactor 360 into electrical power. Thermionic electric power generator 370 is less complex than having a separate thermodynamic cycle to produce the power to run heat exchanger 320. Nuclear reactor 360, propellant pump 340, and heat exchanger 320 are controlled by a control unit 380. In some embodiments, control unit 380 may be computing system 400 of FIG. 4.

FIG. 4 is a block diagram illustrating a computing system 400 configured to control an electric resistance thermal thruster, according to an embodiment of the present invention. Computing system 400 includes a bus 405 or other communication mechanism for communicating information, and processor(s) 410 coupled to bus 405 for processing information. Processor(s) 410 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 410 may also have multiple processing cores, and at least some of the cores may be configured to perform specific functions. Multi-parallel processing may be used in some embodiments. In certain embodiments, at least one of processor(s) 410 may be a neuromorphic circuit that includes processing elements that mimic biological neurons. In some embodiments, neuromorphic circuits may not require the typical components of a Von Neumann computing architecture.

Computing system 400 further includes memory 415 for storing information and instructions to be executed by processor(s) 410. Memory 415 can be comprised of any combination of random access memory (RAM), read-only memory (ROM), flash memory, cache, static storage such as a magnetic or optical disk, or any other types of non-transitory computer-readable media or combinations thereof. Non-transitory computer-readable media may be any available media that can be accessed by processor(s) 410 and may include volatile media, non-volatile media, or both. The media may also be removable, non-removable, or both.

Additionally, computing system 400 includes a communication device 420, such as a transceiver, to provide access to a communications network via a wireless and/or wired connection. In some embodiments, communication device 420 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 420 may include one or more antennas that are singular, arrayed, phased, switched, beamforming, beamsteering, a combination thereof, and or any other antenna configuration without deviating from the scope of the invention.

Memory 415 stores software modules that provide functionality when executed by processor(s) 410. The modules include an operating system 425 for computing system 400. The modules further include thruster and power control modules 430 that are configured to control the heating chamber temperature and pressure by controlling propellant speeds via propellant pump(s) 440, as well as regulate power from a power source 445 to a heat exchanger 450. Computing system 400 may include one or more additional functional modules 435 that include additional functionality.

One skilled in the art will appreciate that a "computing system" could be embodied as an embedded computing system, a flight computer, a microcontroller, an FPGA, or any other suitable computing device, or combination of devices without deviating from the scope of the invention. Presenting the above-described functions as being performed by a "computing system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN) for space vehicles, a mesh network, a satellite communications network, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as FPGAs, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An electric resistance thermal thruster, comprising:
a heating chamber;
a power source configured to provide electrical power;
a heat exchanger located within the heating chamber and operably connected to the power source; and a nozzle, wherein
the heat exchanger is constructed from at least one ultra-high temperature ceramic,
the heat exchanger is configured to resistively conduct an electrical current from the power source, thereby generating heat for the heating chamber to heat propellant when passed therethrough,
the propellant is liquid hydrogen ($H_2$),
the heat exchanger is configured to operate at a temperature greater than 3,000 Kelvin (K) and a pressure of less than 1 megapascal (MPa), thereby causing production of monoatomic hydrogen ($H_1$) from the $H_2$ propellant, and
the nozzle is an extended nozzle comprising a length greater than 12 times a throat diameter of the extended nozzle in order to provide a greater opportunity for the $H_1$ to recombine to form $H_2$.

2. The electric resistance thermal thruster of claim 1, wherein the at least one ultra-high temperature ceramic comprises hafnium carbide (HfC), hafnium carbonitride (HfCN), tantalum carbide (TaC), zirconium carbide (ZrC), or any combination thereof.

3. The electric resistance thermal thruster of claim 1, further comprising:
a propellant tank configured to store propellant;
an injector operably connected to the heating chamber; and
a pump operably connected to the propellant tank and the injector, the pump configured to cause the injector to inject the propellant into the heating chamber.

4. The electric resistance thermal thruster of claim 3, further comprising:
a computing system configured to control operation of the pump and the power source in order to control an amount and temperature of the propellant.

5. The electric resistance thermal thruster of claim 1, further comprising:
a nuclear reactor operably connected to the pump and the heating chamber, wherein
the propellant exits the nuclear reactor and enters the heating chamber.

6. The electric resistance thermal thruster of claim 5, wherein
the power source comprises a thermionic electric power generator operably connected to the nuclear reactor and the heat exchanger, and
thermionic electric power generator is configured to covert waste heat produced by the nuclear reactor into electrical power.

7. An electric resistance thermal thruster, comprising:
a heating chamber;
a power source configured to provide electrical power;
a heat exchanger located within the heating chamber and operably connected to the power source, the heat exchanger comprising hafnium carbide (HfC), hafnium carbonitride (HfCN), tantalum carbide (TaC), zirconium carbide (ZrC), or any combination thereof;
a propellant tank configured to store propellant;
an injector operably connected to the heating chamber;
a pump operably connected to the propellant tank and the injector, the pump configured to cause the injector to inject the propellant into the heating chamber;
a computing system configured to control operation of the pump and the power source in order to control an amount and temperature of the propellant; and
a nozzle, wherein
the heat exchanger is configured to resistively conduct an electrical current from the power source, thereby generating heat for the heating chamber to heat propellant when passed therethrough,
the propellant is liquid hydrogen ($H_2$),
the heat exchanger is configured to operate at a temperature greater than 3,000 Kelvin (K) and a pressure of less than 1 megapascal (MPa), thereby causing production of monoatomic hydrogen ($H_1$) from the $H_2$ propellant, and
the nozzle is an extended nozzle comprising a length greater than 12 times a throat diameter of the extended nozzle in order to provide a greater opportunity for the $H_1$ to recombine to form $H_2$.

8. The electric resistance thermal thruster of claim 7, further comprising:
a nuclear reactor operably connected to the pump and the heating chamber, wherein
the propellant exits the nuclear reactor and enters the heating chamber.

9. The electric resistance thermal thruster of claim 8, wherein
the power source comprises a thermionic electric power generator operably connected to the nuclear reactor and the heat exchanger, and
thermionic electric power generator is configured to covert waste heat produced by the nuclear reactor into electrical power.

10. An electric resistance thermal thruster, comprising:
a heating chamber;
a power source configured to provide electrical power;
a heat exchanger located within the heating chamber and operably connected to the power source; and
a nozzle, wherein
the heat exchanger is constructed from at least one ultra-high temperature ceramic,
the heat exchanger is configured to resistively conduct an electrical current from the power source, thereby generating heat for the heating chamber to heat liquid hydrogen propellant ($H_2$) when passed therethrough,
the heat exchanger is configured to operate at a temperature greater than 3,000 Kelvin (K) and a pressure of less than 1 megapascal (MPa), thereby causing production of monoatomic hydrogen ($H_1$) from the $H_2$ propellant,
the nozzle is an extended nozzle comprising a length greater than 12 times a throat diameter of the extended nozzle in order to provide a greater opportunity for the $H_1$ to recombine to form $H_2$, and
in operation, the electric resistance thermal thruster provides a specific impulse of at least 1,000 seconds.

11. The electric resistance thermal thruster of claim 10, wherein the at least one ultra-high temperature ceramic comprises hafnium carbide (HfC), hafnium carbonitride (HfCN), tantalum carbide (TaC), zirconium carbide (ZrC), or any combination thereof.

12. The electric resistance thermal thruster of claim 10, further comprising:
a nuclear reactor operably connected to the pump and the heating chamber, wherein
the propellant exits the nuclear reactor and enters the heating chamber.

13. The electric resistance thermal thruster of claim 12, wherein
the power source comprises a thermionic electric power generator operably connected to the nuclear reactor and the heat exchanger, and thermionic electric power generator is configured to covert waste heat produced by the nuclear reactor into electrical power.

* * * * *